(12) United States Patent
Stidman

(10) Patent No.: US 12,415,754 B1
(45) Date of Patent: Sep. 16, 2025

(54) SYSTEM AND METHOD FOR COMPOSITE FIRE RESISTANT BUILDING MATERIAL

(71) Applicant: Jimmy Ray Stidman, E. Wenatchee, WA (US)

(72) Inventor: Jimmy Ray Stidman, E. Wenatchee, WA (US)

(*) Notice: Subject to any disclaimer, the term of this patent is extended or adjusted under 35 U.S.C. 154(b) by 0 days.

(21) Appl. No.: 18/656,581

(22) Filed: May 6, 2024

Related U.S. Application Data

(62) Division of application No. 17/681,689, filed on Feb. 25, 2022, now Pat. No. 11,976,007.

(60) Provisional application No. 63/218,465, filed on Jul. 5, 2021.

(51) Int. Cl.
| | |
|---|---|
| *C04B 18/26* | (2006.01) |
| *C04B 22/12* | (2006.01) |
| *C04B 24/24* | (2006.01) |
| *C04B 28/02* | (2006.01) |
| *C04B 40/00* | (2006.01) |
| C04B 103/30 | (2006.01) |

(52) U.S. Cl.
CPC .......... *C04B 18/265* (2013.01); *C04B 22/124* (2013.01); *C04B 24/24* (2013.01); *C04B 28/02* (2013.01); *C04B 40/0028* (2013.01); C04B 2103/304 (2013.01); C04B 2201/20 (2013.01)

(58) Field of Classification Search
CPC ..... C04B 18/265; C04B 22/124; C04B 24/24; C04B 28/02; C04B 40/0028
See application file for complete search history.

(56) References Cited

U.S. PATENT DOCUMENTS

| | | |
|---|---|---|
| 3,271,492 A | 9/1966 | Elmendorf |
| 3,705,837 A | 12/1972 | Breslauer |
| 4,402,751 A | 9/1983 | Wilde |
| 5,171,496 A | 12/1992 | Hsu |
| 5,744,078 A | 4/1998 | Soroushian et al. |
| 6,464,775 B2 | 10/2002 | Crook |
| 7,732,032 B2 | 6/2010 | Dubey |
| 7,993,563 B2 | 8/2011 | Yamazaki et al. |
| 2004/0149174 A1 | 8/2004 | Farrington |
| 2013/0251951 A1 | 9/2013 | Van Elten |
| 2015/0031799 A1 | 1/2015 | Constantz et al. |

OTHER PUBLICATIONS

Hamad A. Al-Mefarrej Testing and Enhancing the Compatibility of Five Saudi Wood Species for Cement-Bonded Particleboard Industry. Alexandria Science Exchange Journal vol. 30 Jul.-Sep. 2009. (Year: 2009).
Mendes et al. Study of new reinforcing materials for cementitious panel production. Environmentla Science and Pollution Research (2021) 28:37217-37230. (Year: 2021).
Moslemi et al. Effect of Various Treatments and Additives on Wood-Portland Cement-Water Systems. Wood and Fiber Science, 15( 2), 1983, pp. 164-176. (Year: 1983).

*Primary Examiner* — John E Uselding
(74) *Attorney, Agent, or Firm* — Bold IP, PLLC; Christopher Mayle

(57) ABSTRACT

A system and method, according to one or more exemplary embodiments, for a fireproof, soundproof, lightweight cement and wood composite wall system that is very inexpensive, outlasts wood frame homes, and replaces many building materials in one installation whereby the composite wall system may be formed from wood shavings, cement, calcium chloride, and water mixed at high speed for air entrainment.

4 Claims, No Drawings

SYSTEM AND METHOD FOR COMPOSITE FIRE RESISTANT BUILDING MATERIAL

CROSS REFERENCE TO RELATED APPLICATIONS

This application is a divisional application that claims priority to U.S. patent application Ser. No. 17/681,689 filed Feb. 25, 2022 which claims priority to U.S. Patent Application No. 63/218,465 filed on Jul. 5, 2021, which are incorporated in their entirety.

FIELD OF THE DISCLOSURE

The overall field of this invention relates to building materials, and more particularly to a wall panel system that is fireproof, lightweight, sound proof, and is well suited for framing residential structures.

BACKGROUND

The use of wood as a building material dates back to the first shelters built by our forebears who, in the absence of a convenient cave, made use of branches and logs collected in their surroundings to protect them against the elements. Since then, the most serious problem that has always accompanied the use of wood walls, wood paneling, and wood ceilings is the risk of fire. With this in mind, many composite materials have been created made of synthetic concrete fibers, glue, and recycled byproducts to achieve sufficient fire safety conditions while providing for reduction of shrinkage and cracking. However, some materials such as Styrofoam when burnt produce toxic gas. Other composite materials are expensive, have danger of corrosion, affect workability, and are not versatile to accommodate for an entire building. Thus, a new type of composite fire resistant building material is needed.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure is generally drawn to a system and method, according to one or more exemplary embodiments, for a fireproof, soundproof, lightweight cement and wood composite wall system that is very inexpensive, outlasts wood frame homes, and replaces many building materials in one installation. The composite wall system may be formed from wood shavings, cement, calcium chloride, and water mixed at high speed for air entrainment.

The following describe one embodiment for a composite resistant building material 100. The invention is illustrated by the following examples, which are provided for the purpose of representation, and are not to be construed as limiting the scope of the invention. All parts and percentages in the examples are by weight unless otherwise specified.

For a liquid cubic yard of composite resistant building material 100, six 90 lb. (540 lb. total) sacks of cement may be mixed with one cubic yard of lodgepole pine wood shavings and 1% or 60 oz per cubic yard of calcium chloride or non-chlorine accelerators mixed at high speed with 52 gallons of warm water. The mixing may be 14-18 revolutions per minute 10 cubic yards. Other types of woods may be used but lodgepole pine is the most suitable because many other types of wood cause decrease in strength, the wood shavings are too large, or will not combine with cement, creating a negative temperature drop. The strength may be raised or lowered by addition or subtraction of amount of cement. Contents may be mixed in a wooden frame or any other suitable location for mixing.

The R-value or the measurement or how insulating composite resistant building material 100 is may be modified by the amount of air entrained within composite resistant building material 100. Any number of different types of air entraining agents or surfactants such as wood-derived acid salts and synthetic resins may be mixed in with composite resistant building material 100. Air entraining agents increase the durability of composite resistant building material 100, especially in climates subject to freeze-thaw, increase workability, and sound attenuation.

Water in one or more preferred embodiments is at a temperature over 50 degrees Fahrenheit. However, this is non-limiting and the temperature of the water may be any suitable degrees that does not stray away from the purpose of the present invention. Water may be heated to this designated temperature or collected and mixed in at this temperature. Components of composite resistant building material 100 may be mixed by an automatic mixing machine.

A similar operation may be used to create one cubic foot mixture whereby all ingredients are separate until mixed together. In this configuration 25 lbs. of Portland Cement type 1 and type 2, 1 cubic foot of curled planar shavings including but not limited to *Pinus contorta* (lodgepole pine) fine dust to 1 inch length with 7.5% moisture content or *Pinus monticola* or *Abies grandis*, and 2.5 gallons water @ 50 to 100 degrees Fahrenheit. The water may be placed in a drum then slowly added to the cement whereby it may be mixed until smooth. The shavings then may be placed in the drum while slowly adding water as needed until the mix flows in the drum. The mix will start entraining air and will foam after 7-10 minutes until optimum foam is reached. Mixing then may occur at 12-15 revolutions per minute after mix is placed in 10 yard mixer or equivalent container. Plasticisers and 13 oz. calcium chloride may then be added for faster setting time The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A fire-resistant composite material comprising: six 90-pound sacks of cement per cubic yard of composite building material; one cubic yard of lodgepole pine wood shavings of the composite building material; 60 ounces of calcium chloride per cubic yard of the composite building material; and 52 gallons of water at a temperature of at least 50 degrees Fahrenheit per cubic yard of the composite building material; wherein the cement, the lodgepole pine wood shavings, the calcium chloride, and the water are mixed at 14-18 revolutions per minute to create air entrainment, resulting in a fireproof, soundproof building material suitable for wall panel construction.

2. The composite material of claim 1, further comprising one or more air entraining agents.

3. The composite material of claim 2, wherein the one or more air entraining agents are wood derived acid salts.

4. The composite material of claim 2, wherein the one or more air entraining agents are synthetic resins.

* * * * *